United States Patent Office 2,772,275
Patented Nov. 27, 1956

2,772,275

HETEROCYCLIC VAT DYESTUFFS

Wilhelm Schmidt-Nickels, Little York, N. J., and Lewis J. Lugg, Pen Argyl, Pa., assignors to General Aniline & Film Corporation, New York, N. Y., a corporation of Delaware No Drawing. Application December 28, 1954,
Serial No. 478,172

11 Claims. (Cl. 260—296)

This invention relates to the production of novel heterocyclic vat dyestuffs having the formula

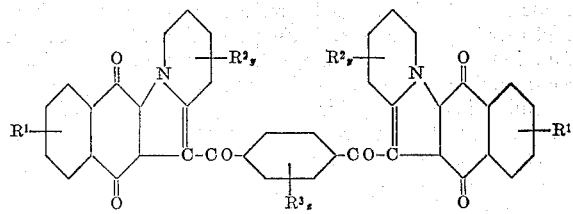

wherein $R^1$ is selected from the group consisting of hydrogen, nitro, amino and halo; $R^2$ is selected from the group consisting of alkyl and halo; $R^3$ is selected from the group consisting of alkyl, alkoxy and halo; $y$ has a value of 0 to 3; and $z$ has a value of 0 to 2.

It has been found that these compounds constitute a group of improved vat dyestuffs which produce bright orange shades of good fastness to washing, chlorine and light when dyed and printed in the usual manner.

The dyestuffs of this invention may be produced by the reaction of a 2,3-dihalo-1,4-naphthoquinone with a pyridine unsubstituted in the 2-position and a terephthaloyl-bis-acetanilide. The exact mechanism of the reaction is not clearly understood, but it is believed that it proceeds in the manner portrayed in the following equations:

It will be understood that in carrying out the foregoing reaction, the starting reactants may contain inert substituents which do not interfere with the desired reaction, such as nuclear substituted alkyl, alkoxy, and/or nitro groups to produce the corresponding substituted products as shown in the generic formula given above. Amino substituted derivatives may be obtained by alkaline reduction of the corresponding nitro compounds. Halogen substituted derivatives may be obtained by halogenation of the products. In the above formula, $R^1$, $R^2$ and/or $R^3$ may when so indicated, represent alkyl such as methyl, ethyl, propyl, isopropyl, butyl or the like, alkoxy such as methoxy, ethoxy, propoxy, or butoxy or the like, nitro, amino, chloro, or bromo or the like. The 1,4-naphthoquinone reactant has its 2 and 3 positions substituted by chlorine or bromine atoms. The reaction takes place readily in proportions of about 2 moles of the 2,3-dihalo-1,4-naphthoquinone, 2 moles of the pyridine, and 1 mole of the terephthaloyl-bis-acetanilide.

Since the reaction involves liberation of HCl, it is desirable to conduct the reaction in the presence of an acid acceptor. It is preferable to employ the pyridine reactant in an amount in excess of that required for the instant reaction. The excess pyridine serves as an acid acceptor and as a convenient liquid medium in which to carry out the reaction. However, other liquid media may be employed which boil within or above the range of temperatures required for the reaction which may be from about 30° to 150° C. Selection of a liquid medium which boils at the desired reaction temperature facilitates temperature control since the reaction may then be carried out under reflux. The reaction product is usually insoluble in the liquid medium employed for the reaction and the precipitate may be readily separated by filtration, washing and the like. However, in instances where the reaction product is soluble in the liquid medium, it may be conveniently separated by drowning in water followed by filtration, washing and the like.

If desired, the vat dyestuffs of this invention may be converted into the alkali metal salts of the polysulfuric acid esters of their leuco forms by the usual known methods such as by treatment with a reducing agent or metal in pyridine-chlorosulfonic acid solution, or by first reducing to the leuco compound and then esterifying in the normal way in an aqueous solution by the action of tertiary amine addition products of sulfur trioxide or in any other suitable manner, followed by treatment with a suitable sodium or potassium compound to produce the desired salt.

The dyestuffs of this invention may be employed for coloring, dyeing or printing film or fibrous material in any form and having a basis of natural or artificial poly-

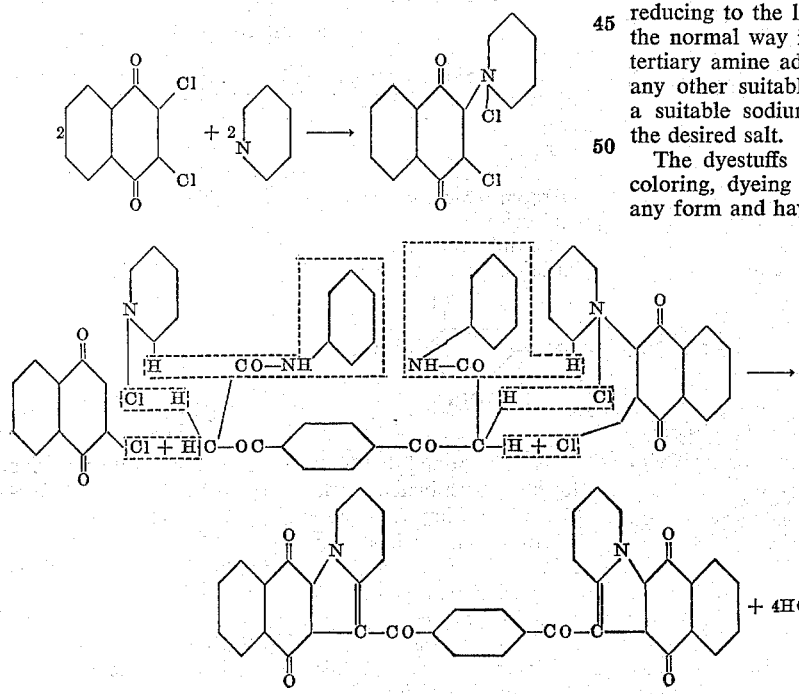

meric material such as cotton or other natural cellulosic material, regenerated cellulose such as derived by the viscose or cuprammonium process or by saponification of cellulose esters, or other material capable of being colored by vat dyestuffs in soluble, dispersed or pigment form.

The following examples, in which parts are by weight unless otherwise indicated, are illustrative of preferred embodiments of this invention and are not to be regarded as limitative. Parts are in grams by weight, in cc. by volume.

*Example 1*

A charge of 50 parts by volume pyridine, 4.0 parts by weight terephthaloyl-bis-acetanilide and 4.5 parts by weight 2,3-dichloro-1,4-naphthoquinone was stirred at reflux for 4 hours. The reaction product was filtered off at room temperature, washed with pyridine, acetone, water and dried. It has the apparent structure:

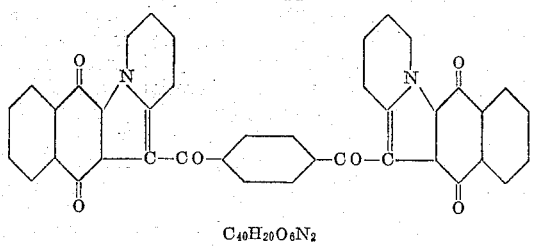

$C_{40}H_{20}O_6N_2$

Found: C=76.57%, H=3.59%, N=5.12%. Theory for $C_{40}H_{20}O_6N_2$: C=76.92%, H=2.88%, N=4.49%.

The compound dyes cotton from an alkaline hydrosulfite vat bright orange shades of good fastness to washing, chlorine and light.

*Example 2*

A charge of 800 parts by volume pyridine, 80 parts by weight "Naphthol AS–L3G" of the structure:

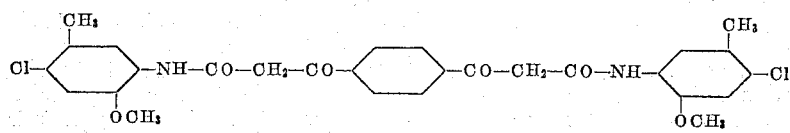

and 65 parts by weight 2,3-dichloro-1,4-naphthoquinone was stirred at reflux for 4 hours. The reaction mixture was worked up as described in Example 1. Dyeings and fastness properties of the resulting product are identical with the results of Example 1. Both compounds have the same structure and summaric formula $C_{40}H_{20}O_6N_2$.

Found: N=4.51%, Cl=trace (1.00%). Theory for $C_{40}H_{20}O_6N_2$: N=4.49%, Cl=0.

The absence of chlorine in the products of this example and in the following example clearly shows that the chlorine-containing anilide groups are split out during the reaction.

*Example 3*

When "Naphthol AS–LG" of the structure

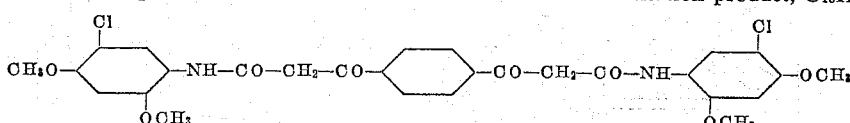

was used instead of "Naphthol AS–L3G" in following the procedure of Example 2, the same vat orange with the same fastness properties was obtained.

Analysis of the product in this case:

Found: N=4.97%, Cl=0. Theory for $C_{40}H_{20}O_6N_2$: N=4.49%, Cl=0.

*Example 4*

A charge of 40 parts by volume pyridine, 4.0 parts by weight "Naphthol AS–L3G" and 3.9 parts by weight 2,3-dichloro-5-nitro-1,4-naphthoquinone was stirred at reflux for 3 hours. The reaction mixture was worked up as described in Example 1. The isolated product has the apparent structure:

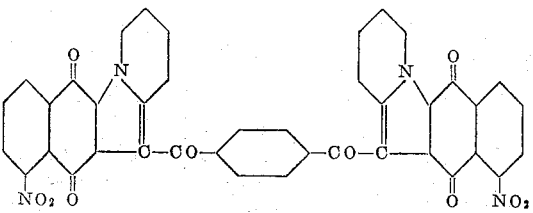

This dinitro compound can be used as a vat dyestuff as is or in the form of its isolated reduction product (diamino compound).

*Example 5*

The reduction of the nitro groups in the product of Example 4 was carried out as follows:

A charge of 250 parts by volume 2% sodium hydroxide solution and 1 part of the above dinitro compound was heated to 43° C. at which temperature 4.0 parts sodium hydrosulfite was added. After agitating at 43° C. for 30 minutes, air was blown through the solution to oxidize the soluble leuco form of the diamino compound to the insoluble keto form which was filtered off, washed neutral and dried. The compound has the apparent structure:

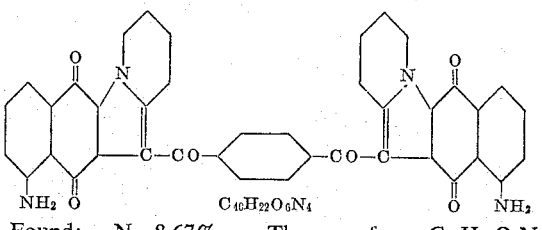

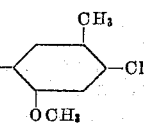

Found: N=8.67%. Theory for $C_{40}H_{22}O_6N_4$: N=8.56%.

The product dyes cotton from an alkaline hydrosulfite vat reddish brown shades of good fastness to washing, light and chlorine.

*Example 6*

A charge of 50 parts by volume nitrobenzene, 5.0 parts by weight vat orange, $C_{40}H_{20}O_6N_2$, prepared as in Examples 1, 2 or 3, 6.4 parts by weight bromine and 0.3 part by weight iodine was stirred at 50–60° C. for 24 hours. The brominated reaction product was filtered off at room temperature, washed with nitrobenzene, benzene and dried.

Found: Br=12.75%. Theory for a monobromine substitution product, $C_{40}H_{19}O_6N_2Br$: Br=11.38%.

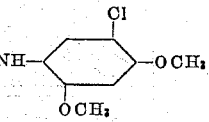

The compound dyes cotton in shades of orange similar to the unbrominated product, and of the same good fastness to washing, chlorine and light.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

We claim:

1. A dyestuff having the formula

[structural formula]

wherein $R^1$ is selected from the group consisting of hydrogen nitro, amino and halo; $R^2$ is selected from the group consisting of lower alkyl and halo; $R^3$ is selected from the group consisting of lower alkyl, lower alkoxy and halo; $y$ has a value of 0 to 3; and $z$ has a value of 0 to 2.

2. A process for producing a dyestuff as defined in claim 1 comprising reacting by heating a 2,3-dihalo-1,4-naphthoquinone having the formula

[structural formula]

wherein $R^1$ is selected from the group consisting of hydrogen, nitro, amino and halo, a pyridine compound having the formula

[structural formula]

in which the 2-position is unsubstituted, wherein $R^2$ is selected from the group consisting of lower alkyl and halo, and $y$ has a value of 0 to 3, and a terephthaloyl-bis-acetanilide having the formula

[structural formula]

wherein $R^3$ is selected from the group consisting of lower alkyl, lower alkoxy and halo, and $z$ has a value of 0 to 2.

3. A dyestuff of the formula

[structural formula]

4. A process for producing a dyestuff as defined in claim 3 comprising reacting by heating 2,3-dichloro-1,4-naphthoquinone, pyridine and terephthaloyl-bis-acetanilide.

5. A process for producing a dyestuff as defined in claim 3 comprising reacting by heating 2,3-dichloro-1,4-naphthoquinone, pyridine and a compound having the formula

[structural formula]

6. A process for producing a dyestuff as defined in claim 3 comprising reacting by heating 2,3-dichloro-1,4-naphthoquinone, pyridine, and a compound having the formula

[structural formula]

7. A dyestuff of the formula

[structural formula]

8. A process for producing a dyestuff as defined in claim 7 comprising reacting by heating 2,3-dichloro-5-nitro-1,4-naphthoquinone, pyridine, and a compound having the formula

[structural formula]

9. A dyestuff of the formula

[structural formula]

10. A process for producing a dyestuff as defined in claim 9 comprising subjecting a dyestuff as defined in claim 7 to alkaline reduction.

11. A monobrominated derivative of a dyestuff as defined in claim 3.

No references cited.